July 27, 1954
G. L. MEYERS ET AL
2,684,508
SEALING STRIP
Filed Sept. 26, 1950
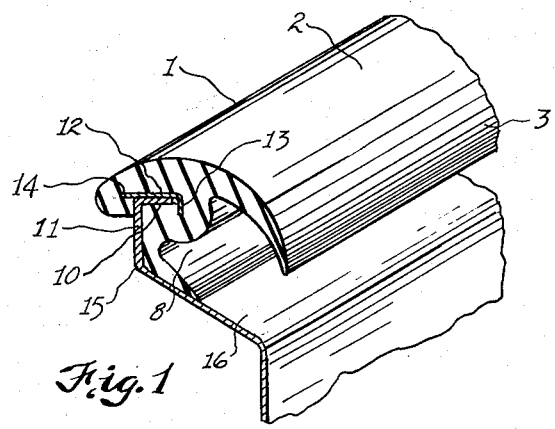
Fig.1
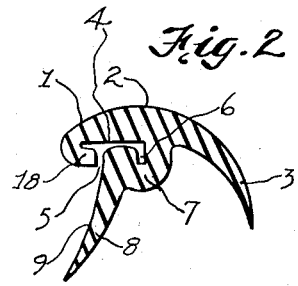
Fig.2
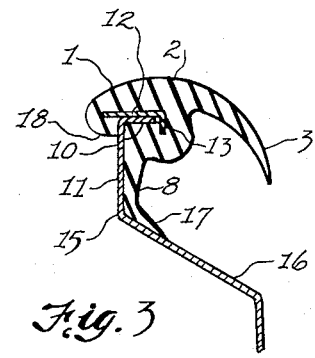
Fig.3
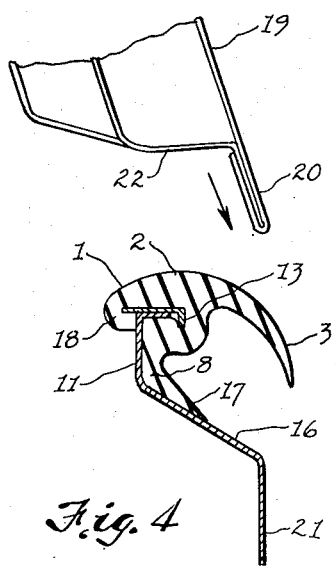
Fig.4
Fig.5
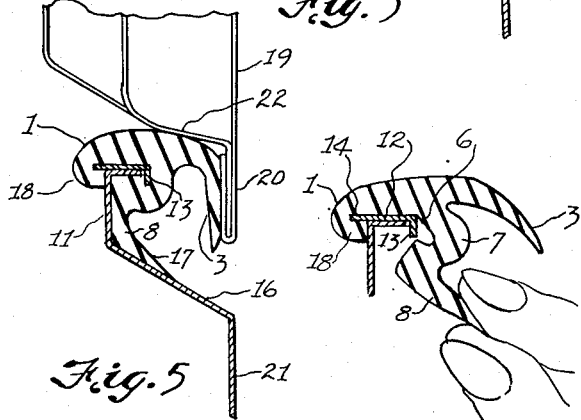
Fig.6
INVENTORS
GEORGE L. MEYERS &
BY JOHN C. SHUTT
Oberlin & Limbach
ATTORNEYS.

Patented July 27, 1954

2,684,508

UNITED STATES PATENT OFFICE 2,684,508

SEALING STRIP

George L. Meyers, Willoughby, and John C. Shutt, Wickliffe, Ohio, assignors, by mesne assignments, to The Eagle-Picher Company, Cincinnati, Ohio, a corporation of Ohio Application September 26, 1950, Serial No. 186,823

10 Claims. (Cl. 20—69)

This invention relates as indicated to a novel sealing strip and, more particularly, to a sealing strip adapted for automotive use.

The modern automobile body includes a number of openings which it is necessary to render dust-tight and rain-proof as well as preventing rattling of the various closure means. Thus, many yards of sealing strip are currently employed on door openings, engine hoods, ventilator openings, and rear trunk compartments and a great variety of forms and shapes of such strips have been proposed and employed in the past in the search for an entirely satisfactory design and construction. Numerous problems are involved. For example, the various openings and closures therefor are never entirely uniform, being mass produced, so that it is necessary that the sealing means be of a type having considerable tolerance and capable of effecting the desired seal despite variations in clearance between the edge of the opening and its closure means. Automobile doors, rear trunk lids and the like are commonly mounted on special hinges whereby the edge peripheral portions of such doors and lids approach the corresponding edges of the openings at various angles so that it is essential that the sealing means employed be of a design to render the same equally effective for its intended purpose about the entire periphery of the opening. In the case of rear trunk compartments, it has recently been a common practice to employ a sponge rubber sealing strip of general U-shaped cross-section cemented within a metal deck channel. Where such strip must pass around corners of the trunk opening, it is customary to employ a specially molded section spliced in place. Such splicing of the sealing strip is both slow and expensive and the cementing step frequently results in cement being smeared upon the body paint, requiring a subsequent cleaning operation. It is accordingly a principal object of our invention to provide a continuous sealing strip, as by extrusion, which may be installed as a single length about the entire periphery of an automobile body opening such as that of a rear trunk compartment including the corner portions thereof.

It is also an object of our invention to provide cooperating lip portions on the metal automobile body and on such sealing strip to enable the latter to be quickly yet securely installed without the necessity of employing cement or any special tool.

Still another object is to provide such sealing strip which will ensure the desired rain-proof, dust-tight seal despite considerable variation in the clearance between the edge of the opening and the closure means and the direction of approach of the edge portion of such closure means during the final movement of the closing operation.

A further object is to provide a sealing strip adapted to be quickly manually installed but which will nevertheless firmly resist stresses and pressures tending to dislodge the same in use.

Other objects of our invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a fragmentary perspective view of a short length of our new sealing strip illustrating the manner in which the same is adapted to be mounted upon a cooperating body edge portion, substantially actual size;

Fig. 2 is a transverse section through such strip showing the conformation of the same prior to being thus mounted on such cooperating body edge portion;

Fig. 3 is a transverse sectional view similar to Fig. 2 but showing the sealing strip deformed when thus mounted;

Figs. 4 and 5 are fragmentary sectional views showing the manner in which one form of automobile rear trunk closure is adapted to approach and meet our new sealing strip in sealing engagement; and Fig. 6 illustrates the manner in which our new sealing strip may be manually installed on the cooperating metal edge portion of the opening.

Referring now more particularly to said drawing and especially Figs. 1 and 2 thereof, our new sealing strip 1 will preferably comprise a continuous strip of resiliently deformable material such as rubber or other resiliently deformable elastomer generally having a relatively high coefficient of friction produced by extrusion through an appropriate die and having the general cross-sectional conformation illustrated in Fig. 2. Vinyl and other synthetic rubbers such as GRS, as well as natural rubber, are suitable materials. Such strip may include an arcuate outer surface portion 2 extending in the form of a continuous tapering fin 3. A generally T-shaped groove extends longitudinally through the body portion of such sealing strip including a transverse portion 4 and a leg or stem portion 5 at right angles thereto. The edge 6 of transverse groove portion 4 adjacent fin 3 also extends a short distance into the body portion of the strip in a direction parallel to groove portion 5. The body portion of the strip forms a rib or elbow 7 about such groove portion 6 and then extends in another outwardly tapering fin 8 disposed generally normal to fin 3. Whereas the stem or entering portion 5 of the groove is generally normal to the transverse portion 4 as above stated, the generally flat face 9 of fin 8 on the side adjacent groove 5 will project at an agle thereto away from fin 3 for a purpose to be explained below. The longitudinally extending groove may accordingly be considered as having a portion of general U-shape cross-section with portion 6 forming one leg and with the other leg 5 opening to the exterior of the body closely adjacent fin 8.

Such sealing strip is adapted to be mounted upon a sheet metal edge portion of the body opening shaped to correspond to such groove portions 4, 5 and 6 of the sealing strip. Such conformation may conveniently be achieved by providing an outwardly extending flange 10 normal to the upstanding portion 11 and spot welding a metal strip 12 thereto having a downturned lip or hook portion 13 along the outer edge and an inwardly extending edge portion 14. Such flange 10 with strip 12 welded thereto is accordingly designed to fit within groove portions 4 and 6 of the sealing strip with portion 11 extending at right angles therefrom through entry groove portion 5 in such sealing strip.

The sheet metal body portion will be bent outwardly at 15 to form a flat 16 which may extend generally parallel to flange 10 but may lie at an angle greater than 90° to intermediate portion 11, as illustrated in the drawing, thereby defining a channel with such flange 10 adapted to receive fin 8 of the sealing strip. Flat 16 will generally extend to a point opposite but spaced from the outer edge of fin 8 whereupon the sheet metal body portion will be recurved away from such fin substantially as shown.

Upon comparing Figs. 2 and 3, it will be at once apparent that in thus mounting the sealing strip upon the supporting edge portion of the rear trunk opening or the like fin 8 is required to be substantially deformed. In the first place, since such fin normally extends inwardly (to the left as shown in Fig. 2), it must be forced outwardly to assume the Fig. 3 position and is accordingly now bearing resiliently against the outer surface of sheet metal portion 11. In the second place, since such sheet metal portion 11 is of less extent than such fin, the end portion 17 lies against the outer surface of outwardly extending flat 16, sharply rebending such fin and causing the same to press firmly against such flat in sealing engagement therewith.

The manner of thus mounting our new sealing strip will best be understood from a consideration of Fig. 6 of the drawing. As there shown, inner lip 18 of the sealing strip is first hooked over the inwardly extending edge portion 14 of strip 12 and tension is exerted on fin 8 to distort elbow 7 and groove portion 6 to permit the latter to engage downturned lip 13. Fin 8 is then pressed against sheet metal portions 11 and 16 as shown in Figs. 1, 3, 4 and 5, being both mechanically and frictionally held in such position.

Now referring more specifically to Figs. 4 and 5 of the drawing, such figures somewhat diagrammatically illustrate one manner in which our new sealing strip may operate in use when mounted on the metal edge portion of an automobile rear trunk opening. The sheet metal trunk lid 19 is formed with a generally conventional peripheral flange 20 adapted when such lid is in closed position (Fig. 5) to extend in a direction generally that of body portion 21. An inwardly extending peripheral sheet metal portion 22 is designed in some applications to bear against the outer arcuately curved surface of sealing strip 1 although clearance will frequently be provided between such parts. The sealing action principally relied on, however, is obtained by engagement of peripheral flange 20 with the continuous arcuately curved fin 3 of the sealing strip which will be forced inwardly thereby as shown in Fig. 5. It will be appreciated that such fin 3 will be effective to afford such sealing action with flange 20 despite wide variation in the direction of approach of such latter flange, since such flange may move toward closing position in the direction indicated by the arrow in Fig. 4 or, for example, in a direction generally normal thereto.

Engagement of inner lip 18 of the sealing strip with the inwardly extending portion 14 of metal strip 12 firmly resists any tendency of lid closing movement such as that shown in Figs. 4 and 5 to dislodge the sealing strip, and fin 8 furthermore firmly presses against sheet metal portion 11 and flat 16 to support such sealing strip against rotative action. On the other hand, when lid 19 is swung in the opposite direction to open the same, downturned metal lip 13 locks the sealing strip against rotative action in the opposite direction under influence of frictional drag between flange 20 and fin 3, and inner lip 18 of the sealing strip additionally presses against portion 11 to resist dislodging of the strip. There is, of course, still less tendency for the sealing strip to be dislodged when the lid or other closure member is mounted to swing in a manner moving flange 20 in a direction generally normal to that shown in Fig. 4 and inwardly toward fin 3 and downturned metal lip 13.

Fin 3 will desirably be quite thin in order to bend readily and provide a minimum of resistance to the closing of the lid while at the same time readily conforming thereto to provide a tight seal. Its general contour, moreover, affords a decorative appearance and trim effect, when exposed, far superior to that of other sealing strips now commonly employed. Such fin is relatively thin where it extends from the body portion of such strip and is located as close as possible to the neutral bending axis of the latter to permit such strip to bend around corners of relatively small radii with a minimum of distortion of such fin. Obviously, the degree of distortion of fin 8 under such circumstances is of less importance.

Fin 3 not only affords the frictional and mechanical features above explained, but itself, of course, provides a permanent seal between the sealing strip and the sheet metal body portion. Once installed, it is impossible to remove such sealing strip except by gripping the tapered edge portion 17 of fin 8 and pulling the same outwardly to disengage groove portion 6 from downturned metal lip 13 and withdraw the body portion of the sealing strip from the region between such downturned lip and upstanding portion 11 into which it has been wedged. Actually, once installed, our new sealing strip is very difficult to remove in any manner, but of course there is very seldom any occasion for desiring to do so. Obviously, the thickness of fin 8 (ordinarily thicker than fin 3) as well as the thickness of elbow 7 may be selected to afford the degree of resistance to distortion desired. Usually, such dimensions will be selected to permit ready installation of the sealing strip by hand while at the same time strongly resisting dislodgement under conditions of use.

It will be appreciated that in the case of a rear trunk opening, for example, the channel defined between fins 3 and 8 when the strip is mounted as shown in Fig. 1 will open generally downwardly along the lower edge of the trunk, generally laterally along the sides of the trunk and generally upwardly along the upper edge of the trunk. Consequently, rain water entering along such upper edge will be conducted laterally and downwardly thereby without being permitted to accumulate and without any opportunity to enter between the seal and flat portion 16, the deformed edge portion 17 of fin 8 forming a tight seal therewith.

As previously indicated, this invention is principally concerned with the provision of novel means for mounting sealing strip, and the sealing portion thereof may take many forms if our means for locking such strip in place is employed. Such locking means comprises principally the cooperating sheet metal channel (formed by portions 10, 11 and 16) having inturned edge or lip 13 and that portion of the body of the strip lying in such channel and engaged behind such lip. Such strip body portion is in effect wedged in place and braced by tapering fin 8 which, being deformed, bears forcefully against the adjacent sheet metal portions 11 and 16 and also frictionally resists any sliding or slipping away from metal channel side 10. Lip 18 of the sealing strip affords a supplemental brace and lock which is desirable but not essential and it, together with upper arcuate portion 2, may be dispensed with in certain embodiments of the invention. Such portion 2 is, however, also desirable both as affording a bumper surface and providing a better trim appearance. The portion of our sealing strip fitting between metal lip 13 and portion 11 will be dimensioned to fit very snugly in such space and, in fact, may be slightly compressibly deformed when installed so as actively to press against the opposed surfaces of such metal portions.

As will be readily apparent from an inspection of Fig. 3, for example, the body portion of the sealing strip press-fitted within the channel between flange 13 and channel bottom 11, once thus inserted, cannot be withdrawn except by pulling down on fin 8, or compressing the material of such fin to permit disengagement of flange 13, or by buckling fin 8 outwardly. In view of the fact that flexing of fin 8 causes it to bear forcibly against the bottom and further side of the channel, it is obvious that accidental disengagement or withdrawal of the sealing strip is for all practical purposes impossible. Fin 8 will preferably taper to a very thin edge.

The combination of our novel channelform frame, commonly continuous with a surrounding sheet metal body portion, with our cooperating sealing strip is particularly suitable for automotive rear trunk openings but obviously may be employed for many other types of closure openings. As above indicated, the provision of metal rib or rim 14 and the cooperating lip 18 on the sealing strip is optional, and inturned flange 13 may be formed by simply bending in the edge portion of channel side 10, such flange extending transversely of the channel mouth generally normal to side 10. Flange 13 may, if desired, be bent somewhat further than shown, to extend at an angle slightly less than a right angle, groove portion being correspondingly modified. The resiliently deformable material of which the sealing strip is formed will desirably have a fairly high coefficient of friction to assist in keeping edge portion 17 of fin 8 in place, but the outer closure-engaging surface of the strip will ordinarily preferably be quite smooth. A length of our new sealing strip may be circularized and the abutting ends joined, as by cementing and vulcanizing, to form a continuous ring in well-known manner. While there is no necessity to employ rubber cement or the like to secure such strip to the closure opening frame, nevertheless cement may additionally be employed, if desired, to adhere fin 8 to the metal channel.

Other modes of applying the principle of the invention may be employed, changes being made as regards the details described, provided the features stated in any of the following claims or the equivalent of such be employed.

We therefore particularly point out and distinctly claim as our invention:

1. Sealing means for automotive rear trunk openings and the like comprising a sheet metal channel portion, a sheet metal strip spot-welded flatwise to a side of said channel adapted to define such opening, one edge of said metal strip projecting slightly beyond the base of said channel and the other edge portion of said strip being bent at right angles to project transversely inwardly of the channel mouth; and a resiliently deformable rubber sealing strip adapted to cooperate with closure means for such opening to seal the latter comprising a substantially continuous extruded rubber strip having a body portion containing a longitudinal groove of generally T-shaped cross-section opening to the exterior at the stem of such T, such groove conforming closely to the channel side including said metal strip with the bottom portion of said channel emerging from the stem of such T-shaped groove, a closure sealing fin extending from such body portion of said sealing strip, and a generally flat tapering fin extending from such body portion of said sealing strip and deformed to bear resiliently against the inner bottom of said channel with its edge portion further flexed to bear forcibly against the further channel side, said last-named fin frictionally resisting withdrawal from within said channel and bracing the portion of said sealing strip body portion engaged between such bent edge portion of said metal strip and the inner bottom of said channel.

2. Sealing means for automotive rear trunk openings and the like comprising an outwardly facing sheet metal channel supported by the surrounding body structure, the edge portion of the channel side defining the inner periphery of such opening being flanged inwardly of said channel generally normal to such side; and a sealing strip of resiliently deformable elastomer composition mounted on said circumferential frame and adapted to cooperate with closure means for such opening to seal the latter comprising a continuous flexible strip having a longitudinally extending sealing portion, the body of said strip being tightly fitted between such flanged-in channel edge portion and the channel bottom, and a tapered fin extending from such body portion of said sealing strip and lying closely against the interior surface of such bottom and further side of said channel, said fin being flexed by engagement therewith to cause the same to bear resiliently thereagainst and thereby both making a tight seal with said channel and also bracing such sealing strip body portion against withdrawal.

3. Sealing means for closure openings comprising a channelform frame having the bottom of such channel lying in a plane generally transverse of such opening, the edge portion of the channel side defining the inner periphery of such opening being flanged inwardly of such channel generally normal to such side; and a sealing strip of resiliently deformable material press-fitted within such channel between such flange and the bottom of such channel, said sealing strip having a longitudinally extending protruding fin adapted to be engaged by closure means for such opening and another longitudinally extending and tapered fin lying closely against the interior surface of the bottom and further side of such channel, said fin being flexed by engagement therewith to cause the same to bear resiliently thereagainst and thereby both making a tight seal with said channel and also bracing said sealing strip against withdrawal from such channel.

4. In combination, a channelform support having an edge portion of a side of such channel flanged inwardly, and a strip of resiliently deformable material tightly fitted within such channel between such flange and the bottom of such channel, said strip having a longitudinally extending tapered fin lying closely against the interior surface of the bottom and further side of such channel, said fin being flexed by engagement therewith to cause the same to bear resiliently thereagainst and thereby both making a tight seal with said channel and also bracing said sealing strip against withdrawal from such channel.

5. In combination, a channelform support having an edge portion of a side of such channel flanged inwardly, and a strip of resiliently deformable material tightly fitted within such channel between such flange and the bottom of such channel, said strip having a flexible brace portion extending therefrom and bearing against the interior surface of the further side of such channel to assist in securing said sealing strip against withdrawal from such channel.

6. As a new article of manufacture, a resiliently deformable rubber sealing strip adapted to be mounted on a cooperating channelform support surrounding an aperture such as an automobile rear trunk opening or the like, and comprising a body portion having a longitudinal groove of generally T-shaped cross-section therein opening to the exterior at the stem of such T, such cross-section of such groove having a short leg extending from one cross-arm of such T in the same direction and generally parallel to the stem thereof, a closure sealing fin extending from said body portion in the general plane and direction of such latter cross-arm of such T groove and curving in a direction generally parallel to the stem of such T, and a generally flat tapered fin extending from said body portion adjacent the opening of such slot on the same side as said first fin and normally projecting at an angle across such opening.

7. As a new article of manufacture, a sealing strip of resiliently deformable material comprising a body portion having two longitudinally extending fins projecting therefrom substantially normal to each other, and a longitudinally extending groove having a portion of general U-shape cross-section in said body portion opening to the exterior of such body portion at one terminal of such U closely adjacent one of such fins on a side thereof away from the other such fin, the cross-section of such groove extending from such opening toward such latter fin within said body portion.

8. A sealing strip adapted to be mounted in a sheet metal channel member having a narrow inturned lip along one side edge of such channel; said sealing strip comprising an elongated body of resiliently deformable material adapted to be tightly fitted in such channel between the bottom thereof and such lip, a portion adapted and disposed normally to extend outwardly of such channel in position to engage a closure member or the like to effect a sealing contact therewith, and a relatively thin flat resiliently flexible tapered fin extending from said body longitudinally thereof and generally normal thereto adapted when flexed to fit and forcefully bear against the bottom of such channel and the side of such channel opposite such lip.

9. Sealing means for automotive rear trunk openings and the like comprising a channel member having a side with a narrow inturned lip adapted to surround such opening, and a sealing strip of resiliently deformable material secured in said channel member comprising an elongated body portion adapted to be tightly fitted between the bottom of such channel and such lip, a sealing portion extending from said body portion adapted to engage a cooperative closure member for such opening to effect sealing contact therewith, and a resiliently flexible fin extending from said body portion longitudinally thereof adapted to extend across the inner bottom of said channel member and to bear forcefully and frictionally against the inner side of said channel member opposite to such lip in outwardly flexed condition.

10. Sealing means for automotive rear trunk openings and the like comprising a support having a trough portion surrounding such opening, and a sealing strip of resiliently deformable material mounted on said support comprising an elongated body portion tightly fitted in such trough and filling the bottom thereof, and a resiliently flexible fin extending from said body portion longitudinally thereof and flexed outwardly from its normal unstressed position to bear resiliently and frictionally against said support to brace said body portion against withdrawal from said trough.

References Cited in the file of this patent

UNITED STATES PATENTS

| Number | Name | Date |
|---|---|---|
| 2,152,590 | Hall | Mar. 28, 1939 |
| 2,484,176 | Lindemann | Oct. 11, 1949 |
| 2,521,617 | Webster | Sept. 5, 1950 |